United States Patent [19]
Wikdahl

[11] Patent Number: 5,026,486
[45] Date of Patent: Jun. 25, 1991

[54] METHOD FOR CONTROLLING APEX FLOW IN AN ARRAY OF PARALLEL HYDROCYCLONES FOR CLEANING AQUEOUS FIBER SUSPENSIONS

[76] Inventor: Nils A. L. Wikdahl, Bravallavagen 42, S-182 64 Djursholm, Sweden

[21] Appl. No.: 912,758

[22] Filed: Sep. 26, 1986

Related U.S. Application Data

[63] Continuation of Ser. No. 691,975, Jan. 16, 1985, abandoned.

[30] Foreign Application Priority Data

Apr. 26, 1984 [SE] Sweden ............................ 8402296

[51] Int. Cl.$^5$ ..................... B01D 45/04; B04C 11/00
[52] U.S. Cl. ............................. 210/787; 210/512.1; 209/144; 209/211; 162/258; 162/263
[58] Field of Search .............. 210/340, 780, 781, 787, 210/512.1, 512.2; 209/144, 211; 162/258, 263, 273

[56] References Cited

U.S. PATENT DOCUMENTS

| | | | |
|---|---|---|---|
| 3,318,070 | 5/1967 | Zeiss et al. | 209/144 |
| 3,929,639 | 12/1975 | Turner et al. | 210/512.1 |
| 3,959,123 | 5/1976 | Wikdahl | 209/211 |
| 4,151,083 | 4/1979 | Dove | 209/211 |
| 4,276,119 | 6/1981 | Karnis et al. | 162/263 |
| 4,283,232 | 8/1981 | Bast | 209/211 |
| 4,292,172 | 9/1981 | Hosokawa et al. | 209/144 |
| 4,386,519 | 6/1983 | Sinkey | 209/211 |

*Primary Examiner*—Robert A. Dawson
*Assistant Examiner*—Wanda L. Millard

[57] ABSTRACT

A method and control system are provided for controlling apex flow in an array of parallel hydrocyclones, used for cleaning aqueous cellulose fiber suspensions, and arranged in a housing with a common inject chamber, base chamber and apex fraction chamber common to all hydrocyclones in the array, featuring the control of apex flow of cellulose fiber suspension by monitoring and maintaining apex flow at a selected value, increasing apex flow through the array whenever apex flow diminishes due to plugging of a hydrocyclone in the array, to aid in avoiding plugging of other hydrocyclones in the array.

2 Claims, 2 Drawing Sheets

Figure 1:
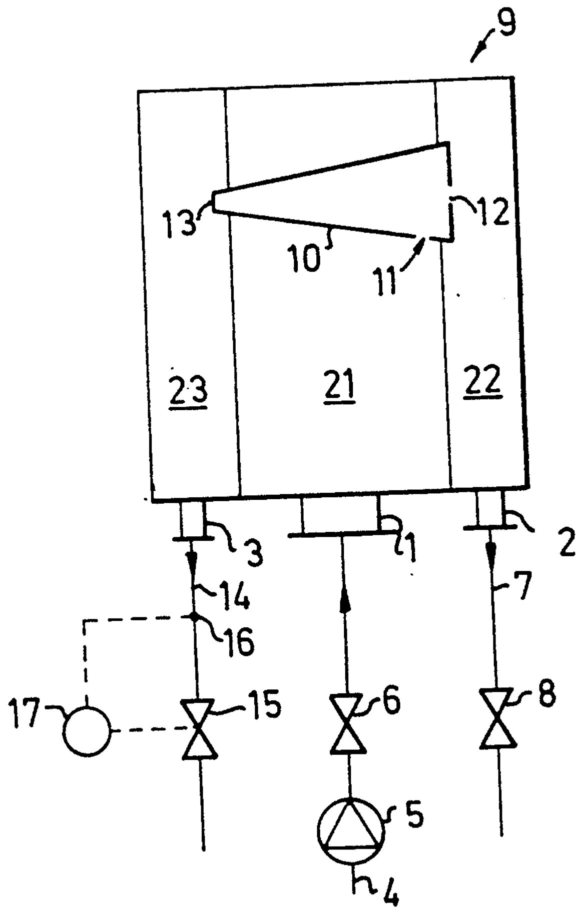

METHOD FOR CONTROLLING APEX FLOW IN AN ARRAY OF PARALLEL HYDROCYCLONES FOR CLEANING AQUEOUS FIBER SUSPENSIONS

This is a continuation of application Ser. No. 691,975, filed Jan. 16, 1985, now abandoned.

In the pulp and paper industry, impure or contaminated cellulose-fiber suspensions are cleansed in screens and hydrocyclone separators. The large impurities are extracted from suspensions in screens, while the smaller impurities which pass through the screen must be extracted from the suspension by means of hydrocyclones. The incoming suspension is classified in these latter separators into a base fraction and an apex fraction.

In order to treat effectively the large quantity of fiber-suspension produced in the aforesaid industry, it is necessary to cleanse the suspension in a multiplicity of small hydrocyclone separators connected in parallel with one another. Normally, a large number of such separators are incorporated in a housing associated with a unit having a respective chamber for the inject, base fraction and apex fraction, said chambers being common to all separators. The inject chamber is provided with an inlet and each of the two remaining chambers is provided with a respective outlet. Such a unit is described in U.S. Pat. No. 3,959,123.

In the operation of a unit of this design, a fiber suspension, thinned to a suitable fiber content, e.g. 0.5%, is fed to the unit at constant flow and pressure. When the plant is operated to extract heavy particles, the larger part of the fibers will leave the hydrocyclone separator through its base opening, while a minor part of the fibers and the major part of all heavy contaminants will leave the separator through the apex opening. Naturally, the plant is optimised in a manner to ensure that only a small quantity of fibers leave the separator through the apex opening. The flow from the apex chamber is normally set by means of a valve located in the conduit extending from the chamber, such that the volumetric flow from said chamber is, for example, 10% of the volumetric flow of inject to the unit. It is normally not necessary to alter this setting under normal operating conditions.

When a unit is operated for the extraction of light impurities, the major part of the fibers will leave the hydrocyclone separator through its apex opening, while a minor part of the fibers and the major part of all light impurities leave the separator through the base opening. The flow from apex chamber is normally set by means of a valve located in a conduit extending from the chamber, for example so that the volumetric flow is about 50% of the volumetric flow entering the unit. This valve setting is also normally left unchanged under normal working conditions.

The concentration of solids, e.g. cellulose fibers, in the two resultant fractions differ from one another, and also from the solids-concentration of the inject suspension. A high concentration of solid material is obtained in the apex fraction, compared with that of the inject and base fractions. In the former case, the volumetric flow of the apex fraction is about 10% of the inject flow, which corresponds to a pulp flow of about 20%. Thus, a pronounced thickening of the pulp suspension is obtained. In the latter case, the volumertic flow of the apex fraction is about 50% of the inject flow, which corresponds to a pulp flow of about 80%.

During operation of the plant, material leaving the apex chamber may, for some reason or another, become lodged in the valve opening, and therewith reduce the through-flow area thereof. This is particularly true of small valves which regulate flows in smaller units, i.e. units which include but a few separators, for example secondary units in the terminal stage. This causes a change in the operating conditions of the separators, which may result in blocking or plugging of the apex opening. Plugging of the apex opening will result in all suspension entering the plugged separator passing through the base opening without being cleansed. This is particularly undesirable when the base fraction constitutes the accept.

Material which has fastened in the valve opening can be removed therefrom, for example by temporarily opening the valve and then returning it to its original setting. On the other hand, it is difficult to remove in a trouble-free manner material which has fastened in or caused a blockage in the apex opening of the separators.

Such blockages can occur even when the starting up a hydrocyclone unit, particularly when the start follows a temporary stop in operations, if said starts are effected with fiber suspension instead of with water. In this respect, the setting of the valve incoporated in the conduit leading from the apex chamber may be such that the volumetric flow through the valve is excessively low. This very often results in a blockage of the apex opening of some of the hydrocyclone separators.

An object of the invention is to provide a method with which there is far less probability of the apex opening of a hydrocyclone separator becoming blocked.

Another object is to provide a method by means of which the volumetric flow from the apex chamber can be automatically held at a constant level.

A further object is to prevent stoppages in operation due to blocking of the shive openings of hydrocyclone separators.

Still another object of the invention is to provide a control system in which the probability of a blockage occurring in the apex opening of hydrocyclone separators is substantially reduced.

The object of the present invention is achieved by automatically and substantially continuously sensing the value of the flow of the shive fraction at a location in or adjacent the apex outlet of a hydrocyclone unit; comparing the sensed flow value with a set-point control value; and when the sensed value differs from the set-point value, changing the setting of a valve arranged in a conduit connected to the apex outlet until the valve of the sensed flow of the apex fraction moves towards the set-point value. The parameter sensed in accordance with the invention is flow. The method is not workable when pressure is the sensed parameter.

The control system for carrying out the method according to the invention includes a sensor for automatically and substantially continuously determining a parameter of a flow in or adjacent to a apex fraction outlet of a hydrocyclone unit; a first means which automatically and substantially continuously compares the value of the sensed flow with a set-point control valve; and a second means which automatically changes the setting of a valve when the sensed flow value deviates from the set-point value, said valve being arranged in a conduit connected to the apex fraction outlet, so that the flow value of the apex fraction moves towards the set-point value.

Figure 2:
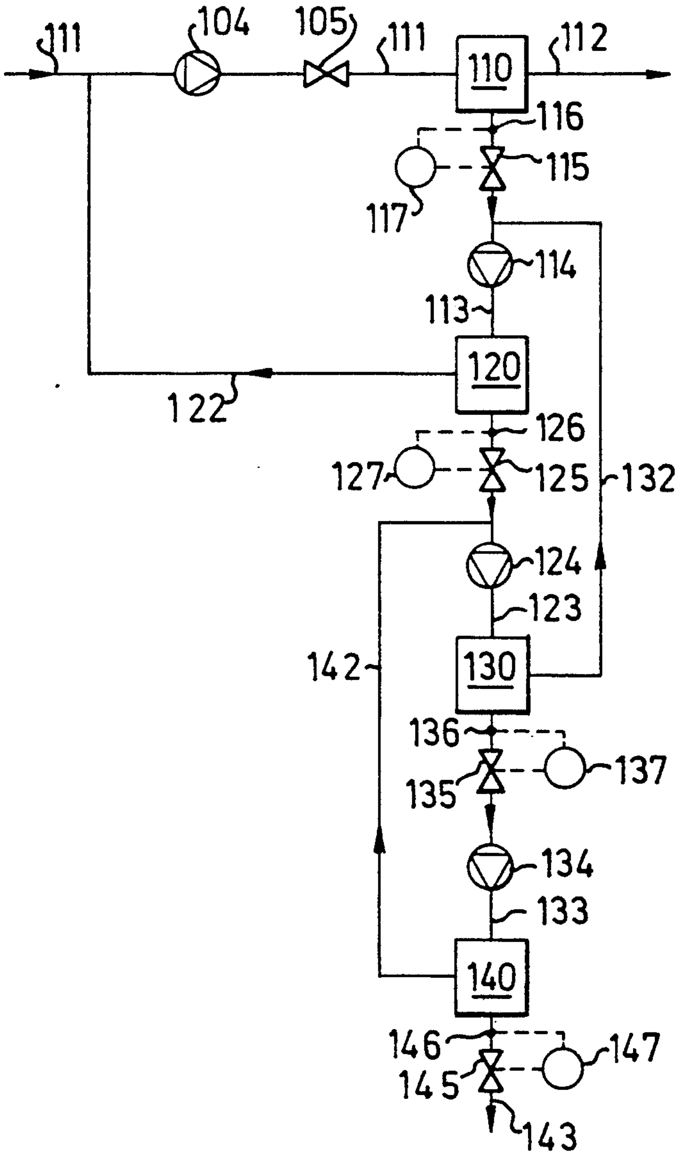

Two embodiments of the invention will now be described in more detail with reference to the accompanying drawings, in which FIG. 1 illustrates schematically and in cross-section a hydrocyclone unit comprising a plurality of hydrocyclone separators, of which only one is shown, and a control or regulating means; and FIG. 2 illustrates schematically a unit in which four hydrocyclone units for separating heavy impurities are coupled in cascade.

Turning first to the embodiment illustrated in FIG. 1, a fiber suspension thinned to a suitable fiber concentration, e.g. 0.5%, and containing impurities which are to be separated from said suspension, is charged to a hydrocyclone unit 9 through a line or conduit 4. The suspension in the conduit 4 is pumped by means of a pump 5 through a valve 6, to the inlet 1 of the inject chamber 21 of the hydrocyclone unit, this chamber being common to all hydrocyclones 10, of which only one is shown. The hydrocyclone unit may be of the kind described and illustrated in the aforementioned U.S. Pat. No. 3,959,123, and may comprise a large number of hydrocyclone separators, or only a small number of such separators, all arranged in parallel. Fiber suspension is introduced from the inject chamber 21 into the separator 10, through at least one inlet opening 11. The suspension is divided in the separator into a base fraction, which leaves the separator through a base opening 12 and is collected in a chamber 22 common to all separators, and a apex fraction, which is removed from the separator through a apex opening 13 and collected in a chamber 23 common to all hydrocyclone separators. The base fraction leaves the chamber 22 through an outlet 2 and is passed through a conduit 7 having a valve 8 incorporated therein. The apex fraction in the chamber 23 is removed therefrom through an outlet 3, a conduit 4 and a valve 15. Arranged in the conduit 14, upstream of the valve 15, is a sensor 16, which, in the illustrated embodiment, is a flowmeter. The sensor may also be arranged in the outlet 3 or in the chamber 23. The flowmeter produces a signal which is proportional to the magnitude of the flow, this signal being passed to a means 17, which compares the magnitude of the signal obtained with the magnitude of a set-point signal. The magnitude of the set-point signal can be pre-set, and changed when necessary. When the magnitude of the real value signal produced by the flowmeter deviates from the set-point value, the means 17 manipulates the value 15 in a manner to cause the flow to move towards the set-point value. Thus, if the flow is too great, the through-flow area of the valve opening is reduced, and vice versa when the flow is too low. The flowmeter may be arranged to provide a flow-value signal continuously or at short time intervals, for example every 10 seconds.

This control method is particularly advantageous when starting-up a hydrocyclone unit, for example following a stop in operations. When there is no suspension in the unit, there is no flow through the conduit 14 and the means 17 will thus case the valve 15 to open fully. When suspension is subsequently fed to the unit, the suspension flows through the conduit 14 in an increasing amount, which is indicated by the flowmeter. The means 17 will then progressively decrease the through-flow area of the valve 15, so that a flow corresponding to the set-point value passes through the conduit 14. In this way, it is impossible for a counterpressure to occur in the conduit 14 of such high magnitude as to result in blocking of at least one of the apex openings of the separators located in the plant.

This method is particularly advantages when controlling or regulating units which include only a few separators. In this case, the conduit 14 has a small diameter, and consequently the value opening is also small. Thus, it requires only a small coating on the throttle means of the valve to radically change the separation or extraction conditions in the separators. The stage to which this applies is often the last stage in a hydrocyclone unit comprising cascade coupled units.

In FIG. 2 there is illustrated a hydrocyclone plant for separating heavy particles comprising four units, each composed of an array of hydrocyclones arranged in parallel, coupled in cascade. It will be understood, however, that the invention is not restricted to the separation of heavy particles, but can also be used for separating light particles. Fiber suspension, thinned to a suitable solid content, is supplied in constant flow to the unit 110, via the conduit or line 111, the pump 104 and the valve 105. The base fraction is taken out through the conduit 112. The apex fraction is taken out through the conduit 113 and the pump 114 and the valve 115. A sensor 116 measures the flow, and the primary unit 110 is regulated or controlled by means of the means 117. The apex fraction in the conduit 113 is supplied to the unit 120, the base fraction of which is returned to the unit 110 through the conduit 122. The apex fraction is taken out through the conduit 123, the valve 125 and the pump 124. As with the previously mentioned sensor 116, the sensor 126 produces a signal value corresponding to a given flow, this signal value being compared with a set-point value in the means 127 and 117 respectively, these means changing the setting of the value 125 and 115 respectively, as required. The set-point values fed to the means 127 and 117 respectively, and also the set-point values fed to the two other, corresponding means 137 and 147, are mutually different and independent of one another.

These set-point values apply, inter alia, to flow, and to the impurities, light or heavy, to be removed.

In one particularly preferred embodiment the sensor 16, 116, 126, 136 and 146 is a flowmeter, particularly a magnetic flowmeter. The flow through the apex conduit is preferably a function of the size of the inject flow, for example a constant factor thereof, although it may also be a function of the speed of feed pumps 5, 104, 114, 124 and 134 associated with respective conduits 4, 111, 113, 123 and 133 connected to the inject inlet 1.

The terminal stage in the cascade includes only a few separators, for example from 6 to 8 and hence, the apex conduit 143 has small dimensions, as has also the valve 145. It is particularly important in this respect that the flow of, apex fraction is never so low that one or more separators can becomes blocked. Blockage of one single separator will result in about 12–17% of the impurities passing to the base fraction and back to the preceding unit.

The invention is not restricted to hydrocyclone units including separators having a apex opening and a base opening, but can also be applied to separators in which two or more fractions are removed at the apex thereof while the base is imperforate, i.e. has no openings. In these separators, the axial, central opening corresponds to the apex opening of the described separator.

What I claim is:

1. A method of inhibiting blockage of apex outlets of hydrocyclones arranged in parallel in an array of hydrocyclones while separating impurities from aqueous cellulose fiber suspensions, comprising:

(1) collecting and combining apex flows of aqueous cellulose fiber suspension from hydrocyclones in the array to form a common apex flow of aqueous cellulose fiber suspension;

(2) automatically and continuosuly sensing the said common apex flow;

(3) comparing the sensed common apex flow to a predetermined standard set-point apex flow corresponding substantially to a desired apex flow of aqueous cellulose fiber suspension; and (4) adjusting and controlling by increasing or decreasing the said common apex flow so that it is maintained at substantially the said standard set-point apex flow.

2. A method according to claim 1 in which the said common apex flow is restricted to a limited flow conforming to the predetermined standard set-point apex flow; further restricting the common apex flow when said flow exceeds the predetermined standard set-point apex flow, and reducing the restricting of the common apex flow when the apex flow falls below the predetermined standard set-point apex flow.

* * * * *